United States Patent [19]

Cotichini et al.

[11] Patent Number: 5,715,174

[45] Date of Patent: Feb. 3, 1998

[54] SECURITY APPARATUS AND METHOD

[75] Inventors: Christian Cotichini; Fraser Cain, both of Vancouver, Canada

[73] Assignee: Absolute Software Corporation, Vancouver, Canada

[21] Appl. No.: 339,978

[22] Filed: Nov. 15, 1994

[51] Int. Cl.$^6$ .............................. G06F 3/00; H04M 3/00
[52] U.S. Cl. .............................. 364/514 R; 340/825.36; 340/568; 364/222.5
[58] Field of Search .............................. 379/56, 57, 93, 379/106, 37, 39, 40, 142, 45, 58, 95; 342/451, 450; 364/222.5, 709.05, 286.4, 514 R; 340/426, 506, 825.44, 825.36, 825.54, 568, 825.34, 571, 572, 503; 307/10.2; 326/8; 180/287; 116/5, 6, 75

[56] References Cited

U.S. PATENT DOCUMENTS

| | | | |
|---|---|---|---|
| 4,999,621 | 3/1991 | Loeb | 340/825.34 |
| 5,077,788 | 12/1991 | Cook et al. | 379/142 |
| 5,511,109 | 4/1996 | Hartley et al. | 379/40 |
| 5,566,339 | 10/1996 | Perholtz et al. | 395/750 |

FOREIGN PATENT DOCUMENTS

0558519  3/1994  European Pat. Off. .

*Primary Examiner*—James P. Trammell
*Assistant Examiner*—Tony M. Cole
*Attorney, Agent, or Firm*—Irell & Manella LLP

[57] ABSTRACT

A method and apparatus with an integral security system. The apparatus includes an electronic device for sending signals to a remote station, such as a pre-determined telephone number, at spaced-apart intervals of time. The signals include identifying indicia for the apparatus. The identifying indicia may be a characteristic serial number. The apparatus may include a computer and software for providing the signals to a communication interface on the computer. Preferably the software is programmed on a memory device for the computer at a location not normally accessible to operating software for the computer such as a boot sector of a disk thereof. The system should contact the remote station without visual or audio signals apparent to the user. The remote station is able to determine the identification and location of the computer from the signals received including the identifying indicia and caller I.D. signals provided by a telephone company.

12 Claims, 10 Drawing Sheets

SECURITY APPARATUS AND METHOD

BACKGROUND OF THE INVENTION

This invention relates to security apparatuses and methods for retrieving lost or stolen items, particularly portable computers or the like.

Electronic devices of various types are becoming more compact and portable. Examples are laptop computers and cellular telephones. While such portability is extremely convenient for the user, this has given rise to an increased risk of theft. Such items are often very expensive and are available to opportunistic thieves when they are left exposed at the workplace, for example. Furthermore, these relatively small, but expensive devices are easily lost. Sometimes the finder cannot easily trace the original owner or may not make serious efforts to do so.

Attempts have been made in the past to provide some means for retrieving lost or stolen items of various types. The simplest approach is probably marking the item with the name and the address of the owner or some identification number such as his or her driver's license number. If the item falls into the hands of an honest person, then this at least gives some way of tracing the owner again. However this approach may not deter a thief who may obliterate any visible markings on the device.

Password protection schemes are of dubious value in discouraging theft or retrieving an item. Data can be protected but not, for example, computer hardware itself.

Another approach has been to place a radio transmitter on the property involved. This is sometimes done for automobiles. The theory is that the police or some commercial organization then will monitor the applicable radio frequency to try and locate a stolen vehicle. This scheme however may not be suitable for some items of property such as small cellular telephones or laptop computers. It is relatively inconvenient to disassemble such devices to try and install a transmitter and there may not be any convenient space available for it. Furthermore, a rather elaborate monitoring service is required to try to locate the source of radio transmission using directional antennas or the like.

The theft or loss of laptop computers, cellular telephones and other such expensive devices has become a major concern to the insurance industry. Often insurance policies contain a special rider at extra cost to insure such items. It is likely that insurance rates could be decreased if a suitable means could be devised for tracing laptop computers, cellular telephones and other such items.

It is therefore an object of the invention to provide an improved means for tracing or locating lost or stolen objects, particularly laptop computers, cellular telephones, desktop computers and other such small, portable electronic devices or expensive office electronic equipment.

It is also an object of the invention to provide an improved means for tracing such items which can be installed without disassembly or physical alteration of the items concerned.

It is a further object of the invention to provide an improved means for locating lost or stolen items which is hidden from unauthorized users to reduce the risk of such means being disabled.

It is a still further object of the invention to provide an improved means for locating lost or stolen items which actively resists attempts to disable the means.

It is a still further object of the invention to provide an improved means for locating lost or stolen items which is relatively inexpensive and reliable.

SUMMARY OF THE INVENTION

According to one aspect of the invention there is provided an apparatus with an integral security system. This includes an electronic device having means for sending signals to a remote station at spaced-apart intervals of time. The signals including identifying indicia for the device.

Preferably the means for sending signals includes a telecommunication interface connectable to a telecommunications system and means for dialing a pre-selected telecommunication number. The remote station includes a telecommunication receiver having the telecommunication number.

Where the electronic device is a computer, the means for sending includes means for providing signals to the telecommunication interface to dial the telecommunication number and send the identifying indicia. The means for providing signals may include security software programmed on the computer.

For example, the telecommunication interface may include a modem.

The security system may be recorded on the boot sector of a hard disk or, alternatively, on a hidden system file such as IO.SYS, MSDOS.SYS, IBMBIO.COM or IBMDOS.COM.

There is provided according to another aspect of the invention a method for tracing lost or stolen devices having a telecommunication interface connectable to a telecommunication system at a first telecommunication station. The method includes the steps of providing the device with means for sending signals to the telecommunication interface. The means automatically sends first signals to the telecommunication interface which dials a remote telecommunication station. The means automatically sends second signals to the telecommunication interface which transmits to the remote telecommunication station identifying indicia for the device. The second signals are received at the remote telecommunication station. The identification of the first telecommunication station is determined along with the identifying indicia from signals received at the remote telecommunication station.

The invention overcomes disadvantages associated with the prior art by yielding a security device for small computers, cellular telephones or the like which can be programmed onto existing memory devices such as ROM devices, hard disks or the like. Accordingly, no physical alteration is necessary or apparent to a thief. The existence of the security device is well cloaked and it cannot be readily located or disabled even if the possibility of its existence is suspected. Apparatuses and methods according to the invention can be very cost effective, requiring relatively inexpensive modifications to software or hardware and operation of relatively few monitoring devices, comprising essentially computers connected to telephone lines by modems.

BRIEF DESCRIPTION OF THE DRAWINGS

In the drawings:

FIG. 6b is a continuation of FIG. 6a;

DESCRIPTION OF THE PREFERRED EMBODIMENTS

The embodiments of the invention described below are used as security systems for personal computers, most likely a portable computer. However it should be appreciated that the invention could be readily modified for use on other devices such as cellular telephones. The security system may include computer software, usually sold on a diskette or possibly a CD ROM, together with a subscription to a monitoring service.

Figure 7:
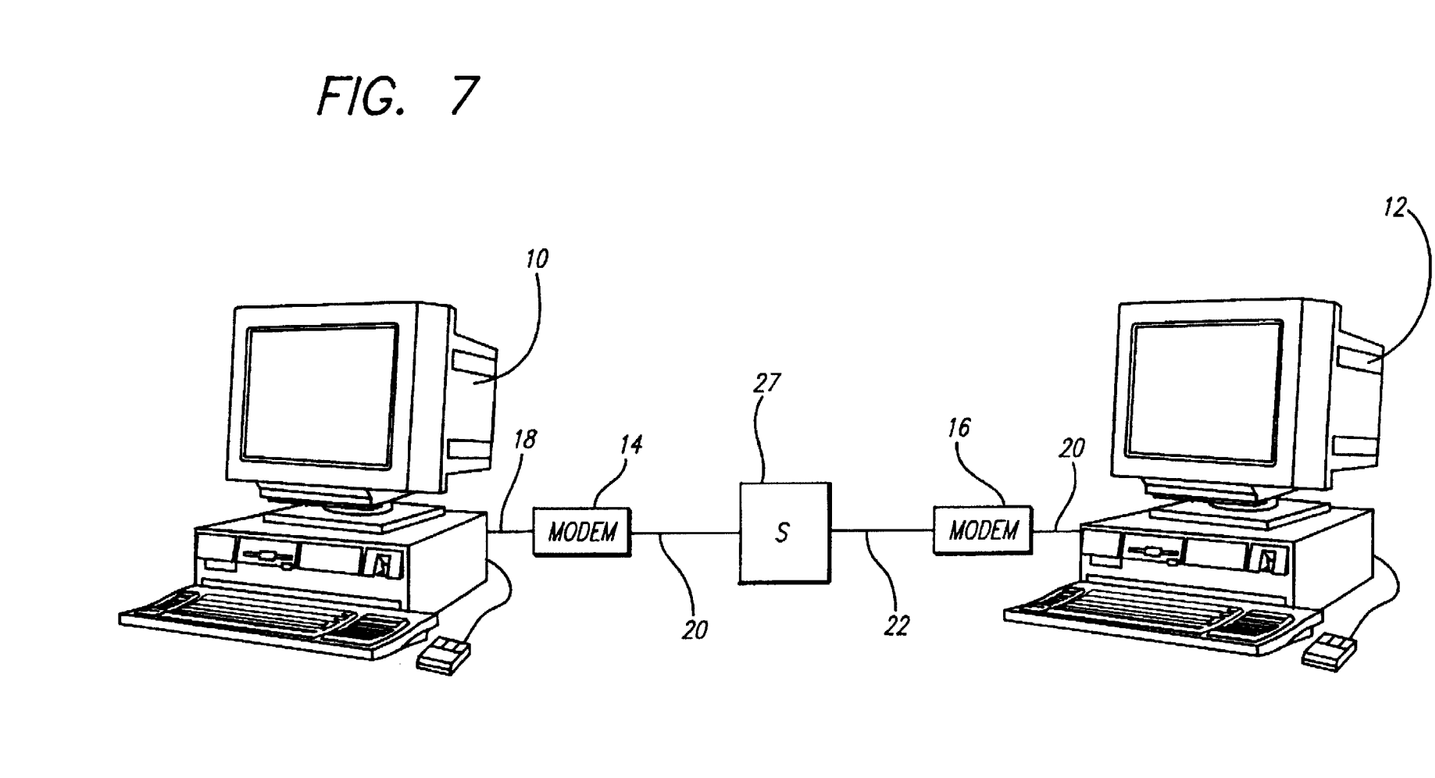
FIG. 7 is an isometric view, partly diagrammatic, of a computer security system according to an embodiment of the invention.

Referring to FIG. 7 this shows two personal computers 10 and 12 which are connected to modems 14 and 16 by way of serial ports 18 and 20 respectively. The modems are connected to telephone lines 20 and 22 which are routed through a switching station 24 forming part of a conventional telephone system. In this example computer 10, termed the client computer, is the device protected by the security system. Computer 12 is the server and is operated by a company providing the security services. Computer 10 and modem 14 form a first telecommunication station while computer 12 and modem 16 comprise a second, or remote telecommunications system.

The aspect of the invention described below is loading the software onto a portable computer such as computer 10. The method of loading is critical because the software ought to remain essentially undetectable once the computer is programmed with the security software. Furthermore, it should be as difficult as possible to erase. In summary, the invention achieves these objects by loading the software in such a manner that it remains hidden to the operating system, such as MS-DOS.

Figure 1:
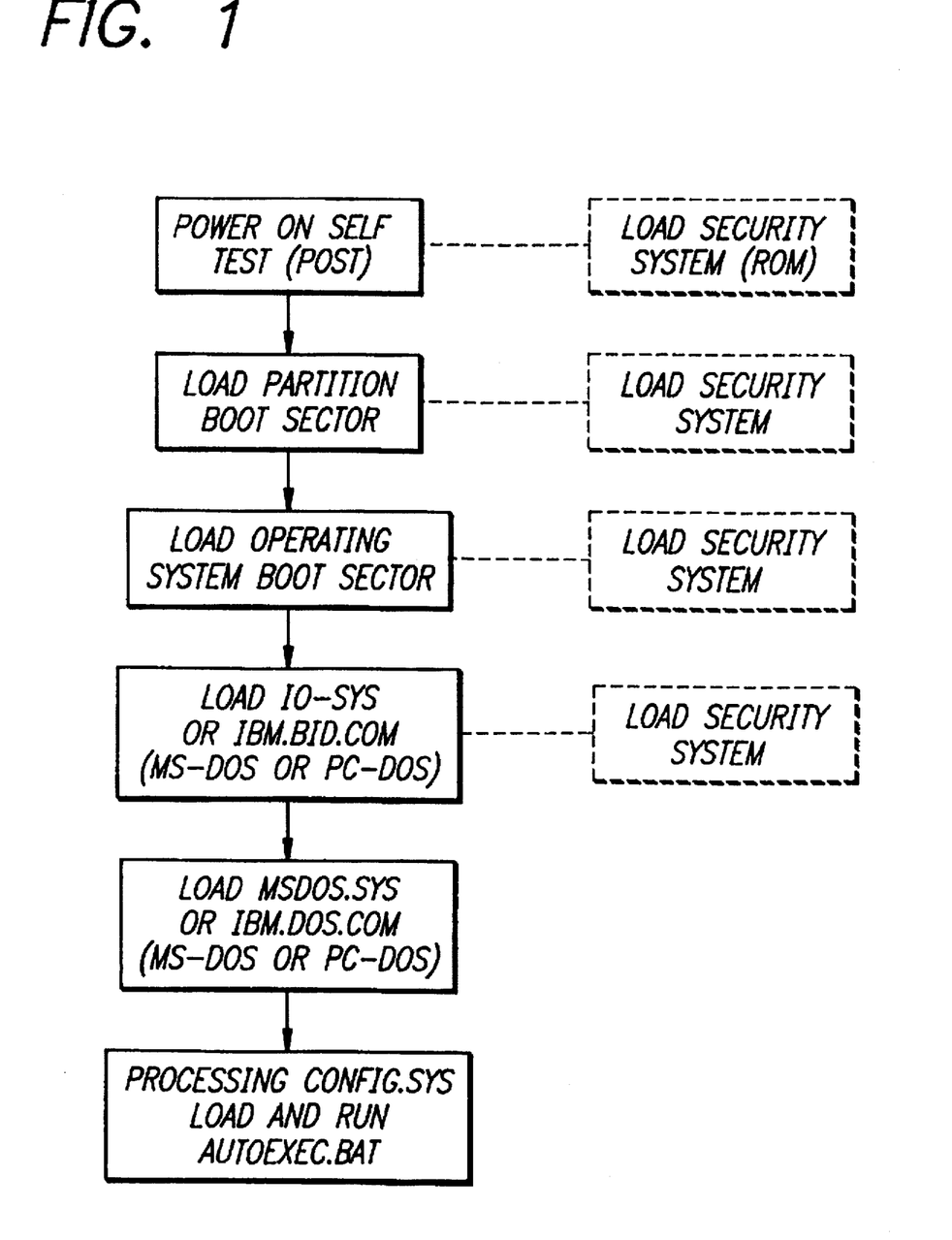
FIG. 1 is a flowchart showing the conventional method of booting up a personal computer with alternative loading points for the security system in broken lines.
Figure 2:
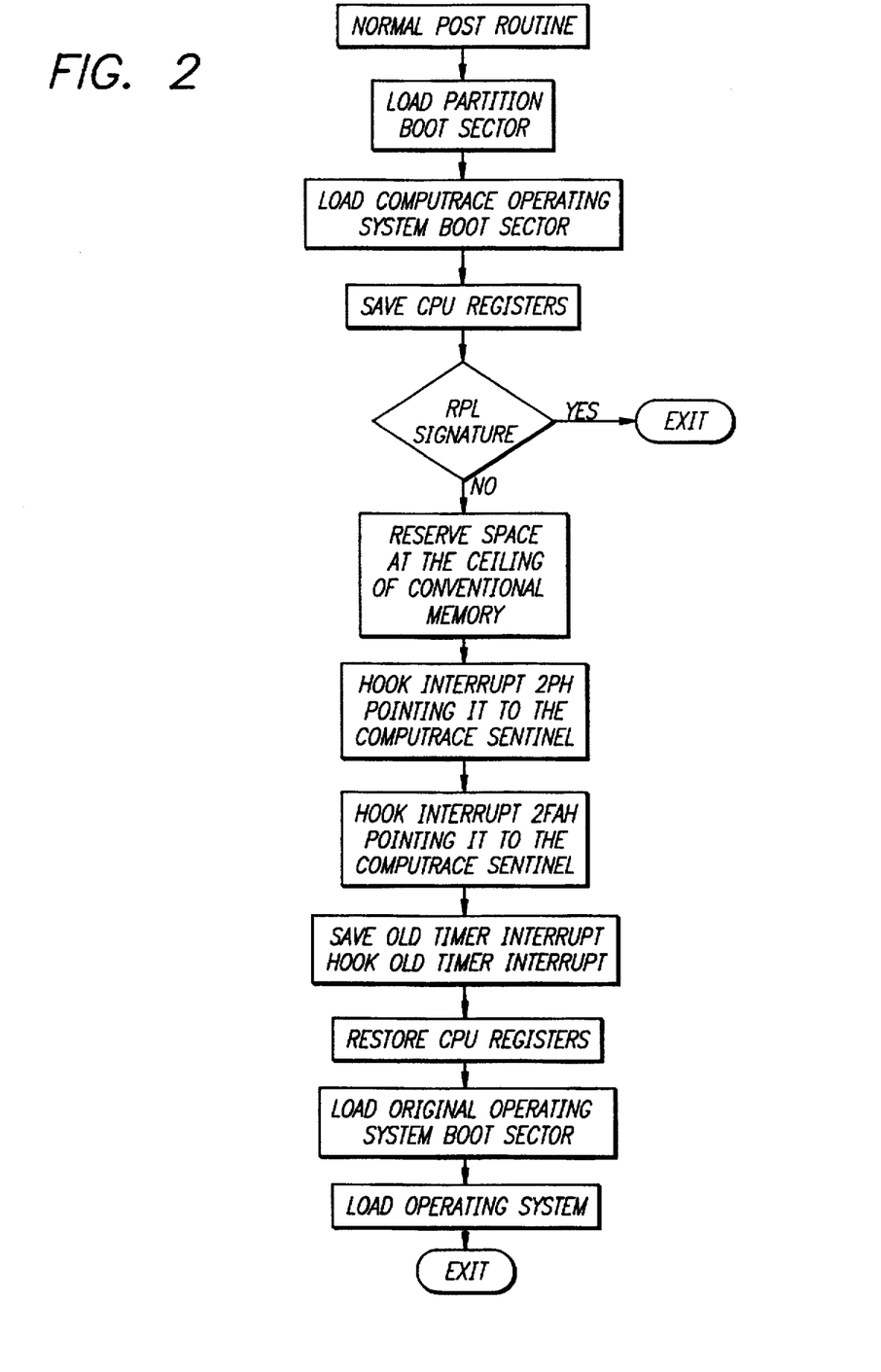
FIG. 2 is a flowchart showing a method and apparatus for startup loading of a security system according to an embodiment of the invention wherein the operating system boot sector is modified.
Figure 3:
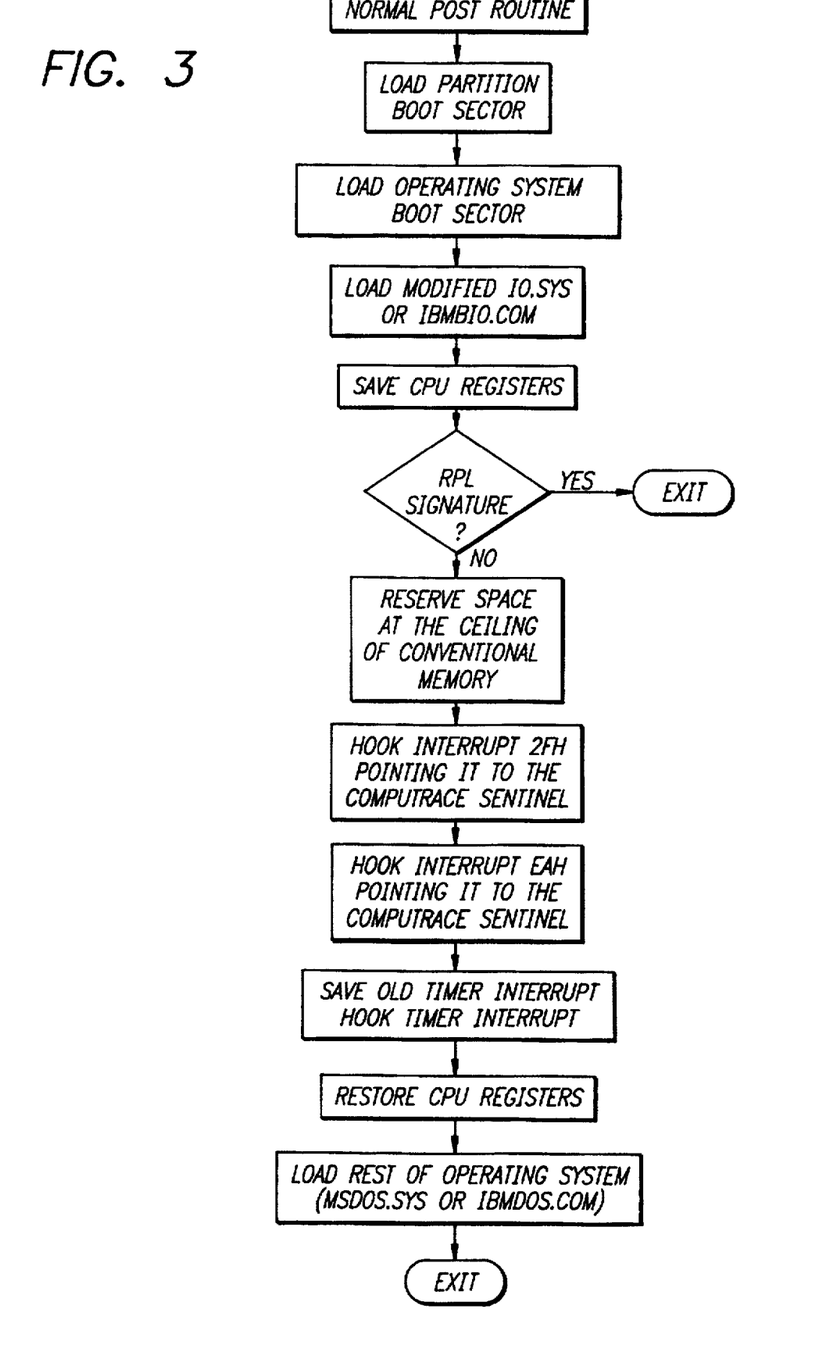
FIG. 3 is a flowchart similar to FIG. 2 wherein the hidden system file IO.SYS or IBMBIO.COM is modified.
Figure 4:
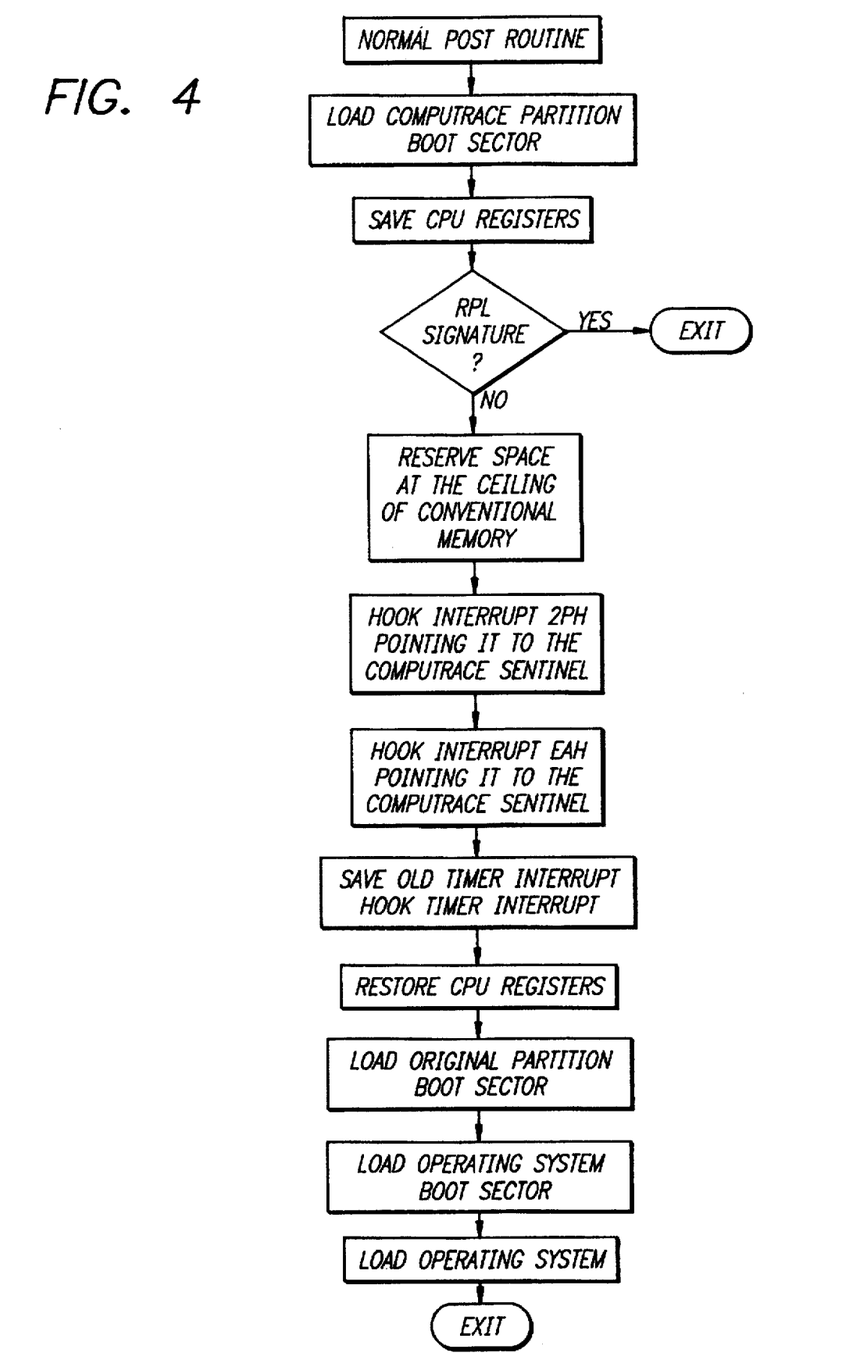
FIG. 4 is a flowchart similar to FIG. 2 and 3 wherein the partition boot sector is modified.

FIG. 1 shows a boot-up process for a typical personal computer. It should be understood that the invention is also applicable to other types of computers presently available or as marketed in future with suitable modifications.

Figure 8:
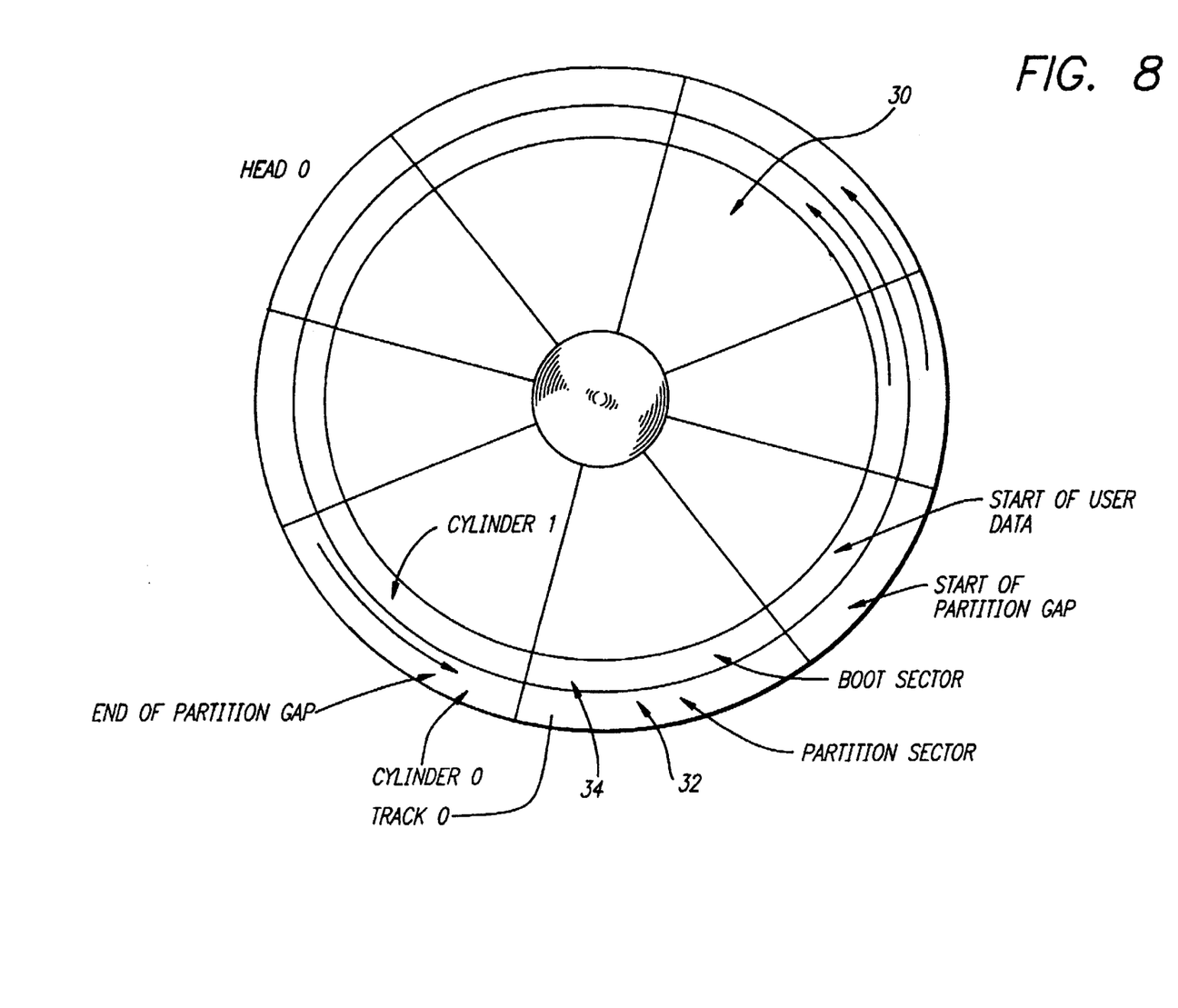
FIG. 8 is an isometric view, partly diagrammatic, of a computer disc containing the software thereof.

Upon hitting the on switch of a personal computer (PC), the computer first goes through a conventional power-on self-test. This ensures that all hardware components are running and that the central processing unit (CPU) and memory are functioning properly. Upon completion of the power-on self-test (POST), the next task is to load software onto the random access memory (RAM) of the computer. Conventionally there is a read-only memory (ROM) device which contains a boot program. The boot program searches specific locations on the hard disk, diskette or floppy disk for files which make up the operating system. A typical disc 30 is shown in FIG. 8. Once these are found, the boot program on the ROM reads the data stored on the applicable portions of the disk and copies that data to specific locations in RAM. The first portion of the disk boot sector to be loaded is the partition boot sector 32 shown in FIG. 8. The partition boot sector then loads the remaining boot sector 34, shown in FIG. 8 from the disk, namely the operating system boot sector. The operating system boot sector serves to load then into memory a system file, normally named IO.SYS on personal computers or IBMBIO.COM on IBM computers. The IO.SYS or equivalent then serves to load the rest of the operating system, conventionally called MSDOS.SYS on MS-DOS systems or IBMDOS.COM for PC-DOS systems. Each of these files is marked with a special file attribute that hides it from the DOS Dir. The security system according to the invention is loaded during the boot up process and accordingly is transparent to the operating system.

Figure 5:
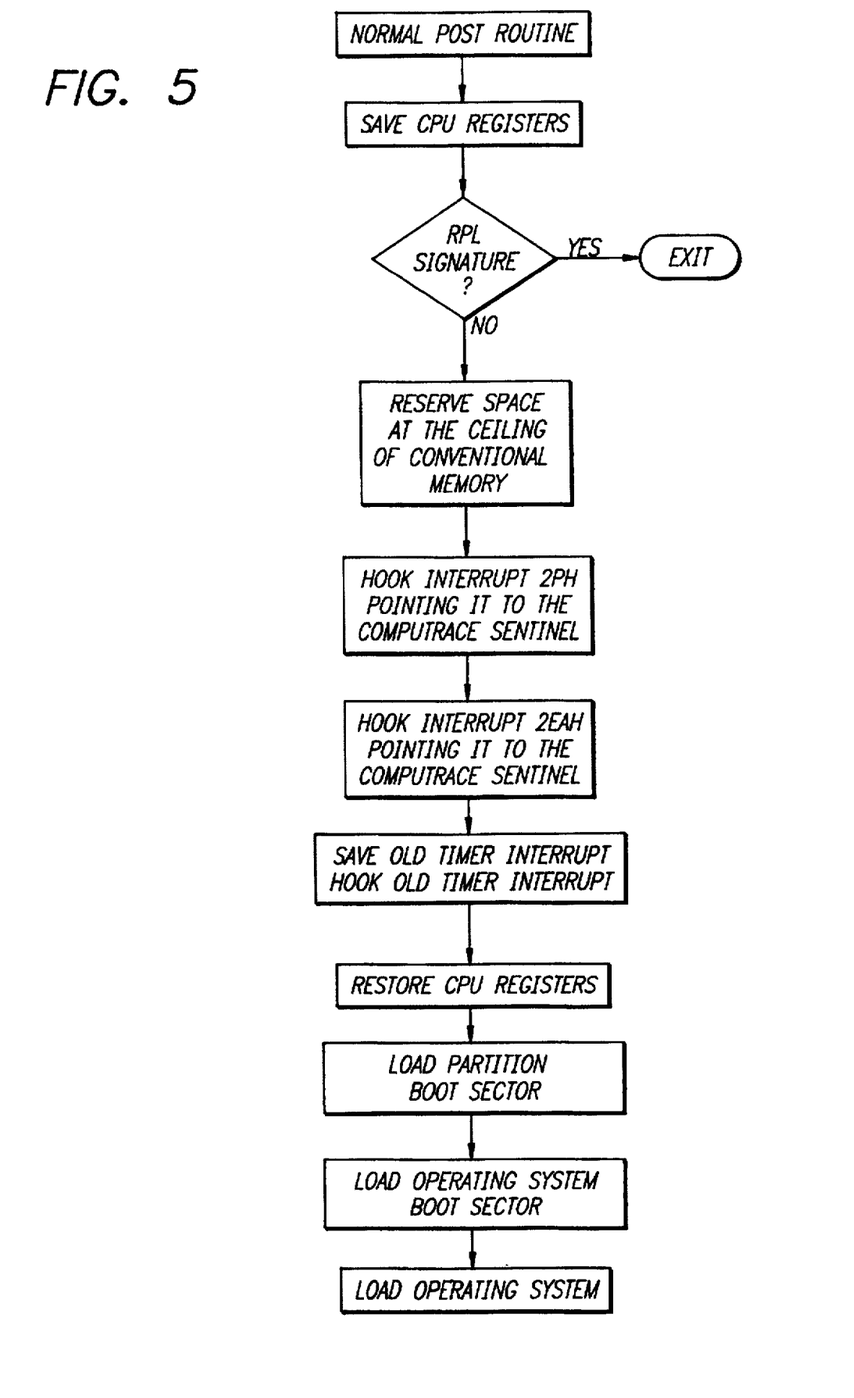
FIG. 5 is a flowchart similar to FIG. 1-4 wherein the security system is ROM BIOS based.
Figure 6A:
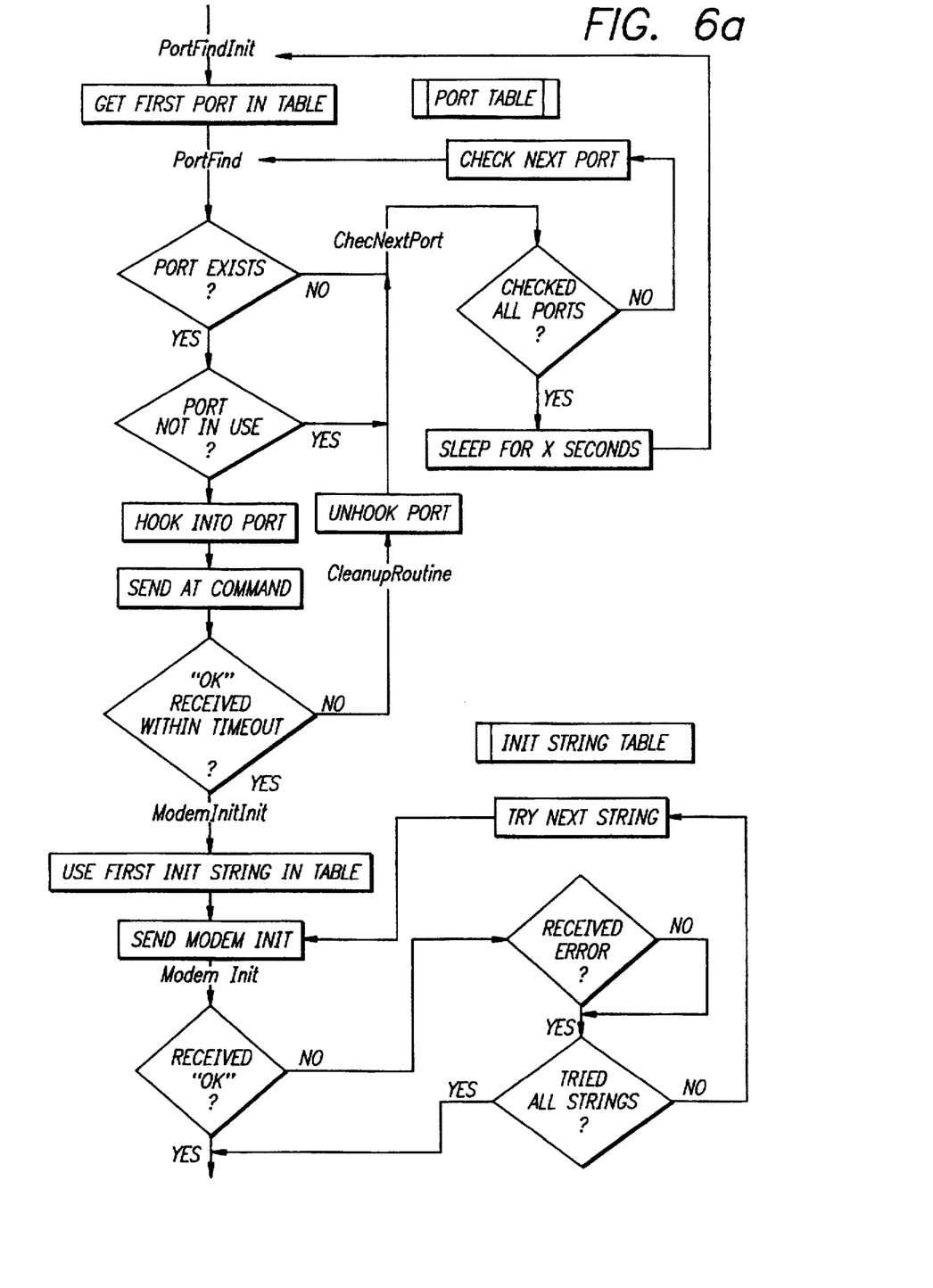
FIG. 6a is a portion of a flowchart showing a security apparatus and method according to an embodiment of the invention.
Figure 6B:
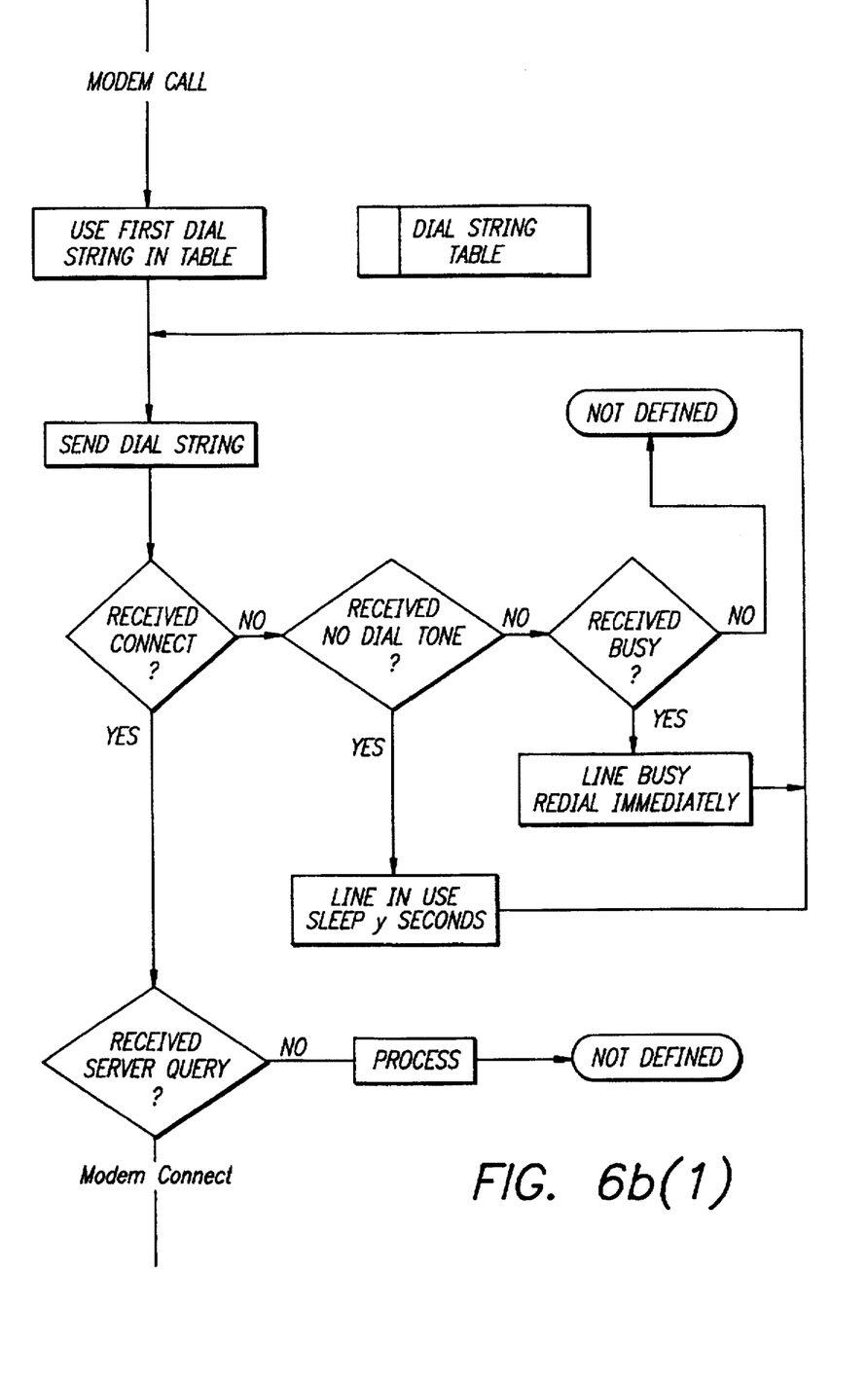

Three alternative ways of loading the security system during the disk boot are illustrated in FIG. 1-4 respectively. A fourth, loading via ROM, is shown in FIG. 1 and 5. Conceivably the system could be loaded with MS.SYS or IBMDOS.COM, but this is more difficult and less preferred than the three alternatives set out below. The user can select one of these alternatives or two or three of them during the loading program of the invention called TENDER. The three main areas that can be effected by the program, and illustrated in FIG. 2-4 respectively, are as follows:
1. The operating system boot sector.
2. A hidden system file such as IO.SYS for MS-DOS or IBMBIO.COM for PC-DOS.
3. The partition boot sector.

Once the user has run the program and selected one, two or three of these alternatives, the system is primed and proceeds to attempt to load the security system according to the present state of the computer memory and the instructions given by the user. The SNTLINIT routine, described in more detail below, initializes the security system and is passed one of three possible options via the AX microprocessor register by the calling program (SUBLOADR), which itself was loaded on any one of the three enumerated areas described above. The SUBLOADR program first performs some trivial initialization, reads the configuration file (which may be encrypted) that was generated for user input. The validity of the configuration file is checked at this point to see if it is corrupted or not. If for some reason it cannot read the configuration file, it initializes the security system from a table of default settings.

The SUBLOADR program then checks to see if the security system is in memory by looking for the 'RPL' signature. SUBLOADR saves the application programmer interface (API) entry point and then determines which version of the security program is in memory, if it is in memory. If not in memory, the SUBLOADR program checks to see if the SNTLINIT routine is on disk.

Depending upon the version of the SUBLOADR program, it may perform a validity check on the SNTLINIT routine. This routine may be a cyclical redundancy check (CRC) of 16 or 32 bits, a checksun check or a hash count.

The TENDER program checks the partition boot sector, the operating system boot sector, and the IO.SYS (or IBMBIO.COM on PC-DOS systems) to see if any of them have been modified to contain the SNTLINIT code. It then compares this to the configuration file, appropriately modifying any of the areas indicated by the configuration file if for some reason the area in question has not already been modified. It then tracks the level of modification that was requested by the user (i.e. whether one, two or three areas were to be modified). Each of these areas has all the modem related information written to it amongst other user selected settings. At this point it writes the current configuration file to disk.

The TENDER program then takes a system snapshot of the partition boot sector, the operating system boot sector and the IO.SYS or IBMBIO.COM file, validating them, determines and then writes this file to disk. It then checks the partition gap between the partitions, calculating the number of unused sectors between the valid boot sectors (be they partition or operating system boot sectors).

There is almost certainly at least 8K of space in the partition gap. The security system requires only 4K. The SNTLINIT module is usually stored here. If for some reason there is not enough space in the partition gap, or if the data area is physically bad, the TENDER program will pick a suitable cluster of sectors, mark it logically as being bad (after verifying that it is not physically bad), then store SNTLINIT there. It sets out the attributes to system, hidden etc. in order to hide the program image. It then calculates the physical coordinates of the cluster that was used and writes this information to the configuration file. At this point the system is ready to proceed and will be loaded prior to the completion of the loading of the operating system regardless of what strategy the user has chosen.

In a manner similar to how viruses reinfect the boot sector of the hard disk drive, the security system according to the invention uses such technology to help protect against theft of the computer. Other technologies such as system timer programming and communications programming are bound to this virus-like technology to create a new technology. The computer periodically calls a remote server silently, and configured by a security company to handle incoming calls from clients after pre-defined time period elapses and enacts a data transaction with that server.

The system is typically in one of two modes of operation:
1. Waiting until it is time to call/report into the server "active mode".
2. Calling or attempting to call the server "alert mode".

The reasoning is that the owner of the computer or other device lets it call out stealthily and unobtrusively in the background after each time (activation period) has elapsed, to report in the computer serial number and client telephone number to a host server that receives the telephone number of the client system. If the system has been reported stolen, the server will then flag the client in such a way that the original owner and/or the authorities will be contacted. The usual calls are done stealthily with little or no indication that such a transaction is occurring. Therefore there is a good chance that the program will be able to do so after it has been stolen. When the system changes it mode of operation from active mode to alert mode, the activation period is reduced to a minimal period just long enough for busy signals and other such temporal error conditions that preclude transaction attempts. The system will stay in this alert mode until a valid transaction has been completed.

Since MS-DOS and PC-DOS were designed to be single-user, single-tasking operating system, the timer interrupt is used to run the system unattended and automatically in the background to provide multi-tasking. Neither the user nor a potential thief would notice this background process although registered owners will be aware of its existence.

In a standard personal computer, routine housekeeping tasks are performed periodically and automatically by the CPU without instructions from the user. There is a timer routine which is called 18.2 times per second to perform such tasks as turning off the floppy disk motor after a certain period of inactivity. The security system hooks into this timer routine. The total timer routine takes about 55 milliseconds and the security system utilizes a small portion of CPU time during that period; this is limited to less than 0.5%. This is not sufficient time to run the entire security program. Accordingly, the security program is run in small increments with each timer routine. It is important that the security program not "steal" enough computer time to be noticed. Otherwise the computer would be noticeably slowed and the existence of the program might be suspected.

Serial port and modem setup routines must be called by the timer interrupt. Once this is done, the serial interrupt handler that is being used will handle the details of data transfer between the client and host systems. Once the system is set up, the serial port interrupt handler does most of the work with the timer interrupt acting as a monitor watching the transaction when it happens between the client and the server. It analyzes the receive buffer and takes the appropriate actions as necessary. The communication portion of the system can handle outgoing and incoming data transfers on its own since it has its own access to the CPU via its own interrupt request (IRQ) line, typically IRQ3 or IRQ4. Therefore the system can handle the data flow between the client machine and the server unattended.

At the start of its time-slice, the timer interrupt checks the flag in the security system, the InComISR flag byte (In Communications Interrupt Service Routine). If the flag is set, the timer interrupt exits immediately so as not to interfere with the progress of any serial communications that may be occurring, therefore not disrupting any transaction in progress. If the flag is not set, the timer interrupt routine will check to see if the security system is in an error state. If not, it will set a flag of its own called TimerISR count to indicate that a timer interrupt is in progress.

A deferred execution function pointer is used to point to the upcoming routine to be executed. Just before the timer interrupt routine finishes, it points to the next routine to be executed. When the next timer interrupt occurs the routine that was pointed to will be executed. The routine must complete in less than 55 milliseconds so that the next timer interrupt does not occur while the routine is still executing.

The following is an overview of the communications routines. The details of serial port communications are well known in the art and therefore will not be described in more detail herein.

Attached to the PC's system bus are communications ports, all of which are optional and typically called COM1, COM2, COM3, COM4 for the first four ports. It is unusual to have more than four serial ports in a PC that is using only MS-DOS or PC-DOS as its operating system. The security system also requires that a modem be connected to one of these serial ports to that calls can be made to a remote host server using normal telephone lines or dedicated telecommunications lines. When alerted, the system needs to be able to find an available serial port, once it does so it checks to see if a modem is attached and tries to initialize it by sending it an initialization string. If successful, it checks for a dialtone, then tries to make a quiet call to a remote host server. Once the server has been connected, the client machine attempts to initiate a data transaction with the server so it can send its serial number and other data defined to be part of the transaction. The server is configured to connect at 2400 bps with no parity, 8 data bits and 1 stop bit. Thus the client matches this configuration. This allows a high connection reliability.

Description of Routines

SNTLINIT:

After this routine has been loaded high into conventional memory and execution has been passed to it, the machine state is saved. Conventional memory is the first 640 kilobytes (655,360 bytes) of memory on an Intel 80X86 compatible computer for example. Registers that are affected by this routine are saved on the stack, "saving the machine state".

The stack referred to is a LIFO structure, where the LIFO stands for "last in first out". It is where you can temporarily save the contents of CPU registers so that you can restore their initial values.

The microprocessor register AX is used to pass one of three values to the SNTLINIT routine. Depending upon which of the three values are passed to this routine, three different courses of action will be taken. Each course of action describes how the program will initialize itself. To summarize, this routine initializes the security system from either the partition boot sector, the operating system boot sector or the input/output module of the operating system.

If the microprocessor register AX contains the value 0:

The partition sector is loaded into memory (which has been overwritten on the disc with the boot sector version of the SUBLOADR module). On execution of this code, the SNTLINIT is called.

If the microprocessor register AX contains the value 1:

The boot sector of the hard disk (which has been overwritten on the disc with the boot sector version of the SUBLOADR module) is loaded into memory. On execution of this code, the SNTLINIT routine is called.

If the microprocessor register AX contains the value 2:

The first sector of IO.SYS/IBMBIO.COM (which has been overwritten on the disk with the IO version of the SUBLOADR module) is loaded into memory.

This routine then tests to see if it is in memory already by checking for the 'RPL' signature located at the start of the address for Interrupt 2FH. If it is in memory, this routine exits (to avoid loading more than one copy of the program into memory).

If it is not already in memory, then it points (hooks) Interrupt 2FH to an internal routine, and does the same with Interrupt EAH. It then hooks Interrupt 8 after saving the original Interrupt 8 vector to an internal memory location (internal to the security system).

The machine state is restored and the routine exits by jumping to memory location 0000:7C00h for the partition table and boot sector execution paths or 0070:0000h for the IO execution path.

SNTLAPI:

This API is for use by an external program. It has three functions as follows:

1. Get state of security system.
2. Set state of security system.
3. Set serial number of system.

SWAPINT:

SwapInt stores the existing interrupt vector by replacing the vector for the interrupt number in the CPU register BX with the new vector pointed to by the CPU register pair DS:CX after it stores the current vector at a location pointed to by the register pair DS:DL. If the CPU register DI contains 0 then the vector for the interrupt number contained in the CPU register BX is not stored.

DELAYFUNC:

This is a delay function used for hardware timing purposes.

TIMERISR:

Interrupt 8h/1Ch is the System Timer Interrupt which executes 18.2 times per second and is used to do the following:

1. Call the old system timer interrupt.
2. Check to see if a communications interrupt is occurring, exiting immediately if so.
3. Save affected CPU registers.
4. Check for an internal state error, exiting immediately if so.
5. Call the state routine.
6. Restore the saved CPU registers.

ACTIVEROUTINE:

The ActiveRoutine checks to see if the activation period has been exceeded. By activation period we mean a period of time that has elapsed since the last valid security call. This period of time is set during the transaction to the server, but is initially set to approximately 7 days.

CHECKNEXT PORT:

This is a check for valid serial ports, and involves checking a table of serial port addresses and then testing them to ensure their functionality. If a valid serial port cannot be found, a sleep state is entered. Upon awakening, this routine is repeated.

DELAYLOOP:

This delay is used for communications delays due to busy signals or no dial-tone and other problems that can affect the communications link.

PORTFINDINIT:

This procedure calls the previously described CHECKNEXTPORT function in its quest for a valid serial port to initialize. On finding a valid serial port, it stores the ports address, and its corresponding interrupt vector.

PORTFIND:

This is a check to see if the serial communications port is in use by dynamically testing the registers in the universal asynchronous receiver-transmitter (UART) that is associated with the current serial port address. Specifically, it tests the Interrupt Enable Register of the UART. This UART register is read into the AL register of the CPU,. and if any of the bits are set (logical 1), then the port is in use, otherwise the port is idle. It also tests the interrupt enable bit of the modem control register in the UART. If the bit is not set (logical 1) then the port is idle and available for use.

Each serial port in the port table is checked until either a valid one is found, or the routine goes to sleep.

If a serial port is found, this routine will decide whether or not to initialize the UART using the system BIOS.

Interrupt 14H routine, or bypass this routine, programming the UART registers directly. If an error occurs during this process, the routine is exited, and CHECKNEXT PORT is invoked.

If the serial port is successfully initialized to the predefined bit rate, parity, word size, number of stop bits etc., the UART is cleared of any pending errors.

The serial port buffer is flushed (emptied), so there is no chance of old data being picked up a second time.

The state flag that the timer interrupt checks on each clock tick is cleared, as interrupt driven communications have not yet been set up. The appropriate interrupt number is selected and the old interrupt vector is swapped with the new one by calling SWAPINT.

The statuses RTS (Request to Send) and DTR (Data Terminal Ready), are enabled in the UART. The 8259 PIC is then unmasked, interrupts are enabled in the UART, then the hardware interrupts for the CPU are enabled. Then this routine exits.

MODEMFINDDELAY:

This procedure sets the [state_routine] function pointer to point to the MODEMFINDINIT routine, delaying execution until the next interrupt.

MODEMFINDINIT:

This routine points to a string to send to the modem, then calls the COMTRANSINIT routine.

MODEMINITINIT:

This procedure tries to initialize the modem with an appropriate initialization string from a table of initialization strings, and will try until either the modem is initialized or there are no more initialization strings in the table to try. The COMTRANSINIT routine is called from within this procedure.

MODEMINIT:

This procedure checks the state of the transmission, and checks for incoming data by calling the COMTRANS and COMTRANSCHECK routines. This procedure ends by jumping to a jump table which points to the next appropriate routine.

MODEMCALLINIT:

This routine attempts to place a call by selecting a telephone number (and its appropriate prefix if necessary) from a table of dial strings. It will continue to do so until either a call is completed or there are no more initialization strings in the table to try. If a call could not be made then the CLEANUPROUTINE and ERRORROUTINE procedures are to be run during the next state(s) (Interrupt 8 system timer ticks).

MODEMCALLINIT2:

This routine checks the state of the transmission, ending if it is complete. This procedure is called from within the MODEMCALLINIT routine. It in turn calls the MODEMCALL procedure.

MODEMCALL:

This routine checks the state of the transmission, ending if it is incomplete. It also checks to see if data has been received yet or not.

MODEMCONNECTINIT:

This procedure waits for a query from the host server (at the other end of the communications link), and sends the serial number of the computer. If a call could not be made then the CLEANUPROUTINE and ERRORROUTINE procedures are to be run during the next state(s) (Interrupt 8 system timer ticks).

MODEMCONNECT:

This routine checks the state of the transmission, ending if the transmission is incomplete.

CLEANUPROUTINE:

This routine resets the sentinel back to a known state (ACTIVE), zeroes the transmission state flags, flushes the UART buffer. Then it disables all interrupts, restores the old communications interrupt service routine via the SWAPINT procedure. It then sets the state routine function pointer to the CLEANUPROUTINE (to be run during the next Interrupt 8).

ERRORROUTINE

The security system state is set to SNTL_STATEERROR (the security system is put in an error state).

COMISR:

The interrupt service routine used to control one of the systems serial communications ports (and one of the Interrupt Request lines) in order to provide telecommunications services to the security system. It calls the SENDBYTE and BUT PUTCHAR procedures. It handles the low-level details of sending and receiving data during the transmission when it happens.

SENDBYTE:

This procedure attempts to send a byte of data to the referenced serial communications port (a variable containing the port address).

COMTRANSINIT:

This procedure initializes a transaction between the security system and the modem. A transaction involves sending a string of data to the modem to be sent via telecommunications link to a host server, which after receiving the string of data, in return, sends back a string of data to the client machine containing the security system. The returned string can then be analyzed by the security system to determine what action should be taken next.

COMTRANS:

This procedure handles much of the technical details regarding the maintenance of the transaction between the security system and the host server. It is primarily responsible for error handling such as incomplete transactions and stalled transmissions.

COMTRANSCHECK:

Checks the results of a completed transaction between the host server, and the client security system against a table of strings. Three possible outcomes are allowed for:

1. If the incoming data has not been completely received, the carry flag of the client CPU is set (logical 1).
2. If the function timed out (exceeded a time threshold value) and no security system internal string matched the string received from the host server, the carry flag of the client CPU is set, and the AH register is zeroed.
3. If a matching string was found, the carry flag on the client CPU is reset (local 0), and the AL register contains a value that matches the internal table entry.

BUF_FLUSH:

Flushes the internal serial port communications receive buffer on the client machine (containing security system).

The buffer is a circular queue. A circular queue is a data structure that has what is called a head pointer and a tail pointer where the head pointer chases the tail pointer around the queue, never really catching it, but processes each byte of the data stored in it. As a byte of data is received by the serial port, it is latched and must be put into a buffer (an area of memory reserved for this purpose) before the next byte arrives (which overwrites the existing latched byte).

Whenever a communications session starts, it is important that both the input and output buffers are flushed so that all new incoming and outgoing data are not contaminated by old data still sitting in the buffer.

BUF_GETCHAR:

Gets a character from the internal serial port communications receive buffer, removing it from the buffers as it does so.

BUF_PUTCHAR:

Adds a character to the internal serial port communications receive buffer. Increments the head pointer, checking to see if the buffer is full, and setting the carry flag it if it is.

BUF_INC_PTR:

Increments the receive buffer pointer assigned to the client CPU register SI, and wraps it if necessary.

INT2FVECT:

Reserves the required space at the top of conventional memory for the RAM resident portion of the security system. The undocumented Interrupt 21H, Function 4AH, SubFunction 06 is used to do this.

Operation

The following is a description of what happens during the period of time when the security system is in "active" mode:

Approximately 18.2 times per second, the timer interrupt will occur. Every 18 timer interrupts, the complementary metal-oxide semiconductor (CMOS) real-time clock will be accessed, and the time and date will be stored for comparison with the previous real-time clock access. If the date and/or time changes towards the future, no action will be taken to track the time displacement. This means that if the date is set far enough into the future, it will cause the security system to change its mode of operation from active to alert whereby calls will be regularly attempted until a call is made and a transaction with the host server has been completed. If the system time has been backdated, this will also cause a modal change from active to alert.

The following is a description of what happens when the security system is in "alert" mode.

The communications ports are checked (via a port address table) to see if they exist. If the first one encountered is not in use, it will be dynamically hooked into by swapping the appropriate interrupt handler and unmasking the appropriate interrupt request line. If an error occurs, the next port will be checked until either a valid port is found or the port address table has been exhausted. Appropriate cleanup routines restore "swapped" ports to their initial settings.

If the communications port responds properly, the system will then attempt to connect to a modem via issue of the Hayes compatible AT command. If the modem does not exist, then the next port will be checked. If the modem responds with an 'OK' to the AT command, the system will attempt to initialize the modem by sending it a modem initialization siring (from a table of initialization strings). If the initialization attempt failed, then the next string in the table will be tried, and so on until a valid initialization string is found, or the modem initialization string table is exhausted (at which point, the routine will delay for some seconds then try again from the start, using the first initialization string).

Once a valid and available communications port has been found, and it has been verified that a functional modem is associated with that port, the system will attempt to dial out to the remote host server.

A dial string table is used to attempt the call since a PBX or switchboard etc. may need to be exited via a dialing prefix. If successful, the CONNECT result code (numeric or verbose) from the remote host server will be received by the client. At this point, telecommunications have been established and the client-server transaction begins. If the transaction succeeds, the resultant state will be "active", otherwise "alert". If, for some mason, a "NO DIALTONE" event happens, a delay will occur and the next dial string will be attempted. If the line is "BUSY", then a redial attempt will occur using the same dial string for a predefined number of attempts or a telecommunications connection is made, whichever comes first.

The client to remote host server transaction involves the sending of the computer serial number via the telephone company or carrier service. The "CallerID" is implicitly received by the remote server (typically during the initial telecommunications event known verbosely as "RING"). Upon the telecommunications event verbosely called "CONNECT", the remote host server sends the security system client a vendor specific message called "QUERY" which in effect tells the client to send the serial number. The sending of this serial number involves the server acknowledging that it has indeed received and processed the serial number (validating it). The client computer will attempt to send this serial number a predefined number of times before it gives up (cleaning up and returning to "alert" mode). Typically, the client will wait until the server tells it to disconnect via a vendor specific "DISCONNECT" message. At this point, the communications port used will be restored to its pre-call state. Any other cleanup necessary (such as changing the date of the last call to the present) will also be done here. Finally, the resultant state will be reset to active.

If the computer that called in was not reported stolen, no further action with regard to the computer system that called in will be taken. If, however, the serial number transmitted to the remote host server matches one of the serial numbers on a currently valid list of stolen computers, further processing will occur to facilitate the recovery of the missing equipment. Such processing includes, but is not limited to, placing either an automatic or manual call to the local authorities in the vicinity of the missing equipment.

VARIATIONS AND ALTERNATIVES

The above description relates to the security system installed and operating in a conventional PC with an Intel 80X86 microprocessor or equivalent and with a conventional MS-DOS or PC-DOS operating system. It will be recognized that the system can be modified to fit other types of computers including, for example, those sold under the trademark Macintosh. The system can easily be modified to suit other types of operating systems or computers as they develop in this rapidly advancing art.

The above system is also intended to be added to existing computers without physical alteration. Another approach is to modify the ROM of such computers to contain the security system as shown in FIG. 1 and 5. This is generally not considered to be feasible for computers sold without the security feature, but is a theoretical possibility at least. More likely is the possibility of incorporating the security system into the ROM of portable computers, cellular telephones or other such items when they are manufactured. FIG. 5 above describes the loading of the system from such a modified ROM.

The description above also assumes that the computer device has a modem connected thereto or includes an internal modem. In future it is likely that telephone systems will be digitized, thus obviating the need for a modem.

The system could also be included in the ROM of a cellular telephone. Obviously in this case a modem is not required, but the programming should be designed to hide the outgoing calls from the user by silencing audio signals and maintaining a normal screen display. It is also conceivable that portable computers can be supplied with integral cellular telephones modified in this manner or with some other telecommunications device. It is not clear at the time of this invention exactly the direction telecommunications are likely to go in the immediate future although several new systems are under development. The main criteria for this security system is that the outgoing transmission, be it by wire, radio signal or otherwise, be received by a switching mechanism and contain information causing the switching mechanism to forward the information received to the remote station. In simple terms this is a telephone number at present, but some other indicia representing the remote station may be substituted in alternative switchable communications system.

It will be understood by someone skilled in the art that many of the details described above are by way of example only and are not intended to limit the scope of the invention which is to be interpreted with reference to the following claims.

What is claimed is:

1. A computer including a RAM device and a magnetic recording disc, an integral security system and a central processing unit, comprising:

means for sending signals including identifying indicia for said computer at spaced-apart intervals of time to a remote station having a telecommunication receiver via a telecommunications interface connecting said computer to a telecommunications system;

means for accessing a pre-selected telecommunication number to access said remote station; and means for providing signals to said telecommunication interface to dial said telecommunication number and send said identifying indicia without signalling a user interface, said means for providing signals including security software recorded on said disc in a manner such that the security software is loaded onto said RAM device before operating software.

2. An apparatus as claimed in claim 1, wherein the disc has a boot sector, the security software being recorded on the boot sector.

3. An apparatus as claimed in claim 1, wherein the disc has a hidden system file, the security software being recorded on the hidden system file.

4. An apparatus as claimed in claim 3, wherein the computer is a personal computer and the hidden system file is IO-SYS or MS DOS-SYS.

5. A method for providing a computer with a security system, comprising the steps of loading software into the computer with instructions for dialing a remote telecommunication number without emitting visible or audible signals to the user of the computer and transmitting identification indicia for the computer, and recording the software on a hard disk of a computer at a location loaded into RAM of the computer prior to loading of the operating software into RAM.

6. A security system for a computer including a hard disc and RAM and having operating software, comprising:

means for loading software into the computer with instructions for dialing a remote telecommunication number without emitting visible or audible signals to the user of the computer;

means for transmitting identification indicia for the computer;

means for recording the software on said hard disc at a location which is loaded into said RAM prior to loading of said operating software into RAM.

7. A method for providing an integral security system for a computer having a central processing unit, a RAM device, a magnetic recording disc and operating software, said method comprising the following steps:

sending signals to a remote station through a telecommunication interface connecting said computer to a telecommunication system at spaced-apart intervals of time, said signals including identifying indicia for said device;

accessing a pre-selected telecommunication number for accessing a telecommunication receiver associated with said remote station;

providing signals to the telecommunication interface to dial said telecommunication number and send said identifying indicia without signalling a user interface, said step of providing signals uses security software programmed on said electronic device;

recording said security software on said disc in a manner such that said security software is loaded onto said RAM device before said operating software.

8. The method as claimed in claim 7, wherein the disc has a boot sector, and said step of recording further includes recording the security system on the boot sector.

9. The method as claimed in claim 7, wherein the disc has a hidden system file, and said step of recording further includes recording the security software on the hidden system file.

10. The method as claimed in claim 9, wherein the computer is a personal computer and the hidden system file is IO-SYS or MS DOS-SYS.

11. A computer with an integral security system and a central processing unit, comprising:

means for sending signals including identifying indicia for said computer to a remote station having a telecommunication receiver via a telecommunications interface connecting said computer to a telecommunications system, said signals are sent at regular, periodic intervals wherein said means repeatedly sends said signals at intervals shorter than said periodic intervals if the remote station does not receive said signals;

means for accessing a pre-selected telecommunication number to access said remote station; and means for providing signals to said telecommunication interface to dial said telecommunication number and send said identifying indicia without signalling a user interface, said means for providing signals including security software programmed on said computer.

12. A method for providing an-integral security system for a computer having a central processing unit, said method comprising the following steps:

sending signals at regular, periodic intervals to a remote station through a telecommunication interface connecting said computer to a telecommunication system, said signals including identifying indicia for said computer, wherein said signals are sent repeatedly at intervals shorter than said periodic intervals if the remote station does not receive said signals;

accessing a pre-selected telecommunication number for accessing a telecommunication receiver associated with said remote station; and providing signals to the telecommunication interface to dial said telecommunication number and send said identifying indicia without signalling a user interface, said step of providing signals uses security software programmed on said electronic device.

* * * * *

UNITED STATES PATENT AND TRADEMARK OFFICE
CERTIFICATE OF CORRECTION

PATENT NO. : 5,715,174
DATED : February 3, 1998
INVENTOR(S) : Cotichini et al.

It is certified that error appears in the above-identified patent and that said Letters Patent is hereby corrected as shown below:

Column 5, line 61: replace "mining" with --turning--.
Column 11, line 12: replace "handier" with --handler--.
Column 11, line 23: replace "siring" with --string--.
Column 12, line 18: replace "Macintosh" with --MacIntosh--.

Signed and Sealed this

Seventeenth Day of August, 1999

Attest:

Q. TODD DICKINSON

*Attesting Officer*    *Acting Commissioner of Patents and Trademarks*